US008447815B2

(12) United States Patent
Pattan

(10) Patent No.: US 8,447,815 B2
(45) Date of Patent: May 21, 2013

(54) SYSTEM AND METHOD FOR INSTANT MESSAGE TRANSMISSION IN MOBILE COMMUNICATION TERMINAL

(75) Inventor: Basavaraj Jayawant Pattan, Karnataka (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/911,072

(22) PCT Filed: Apr. 7, 2006

(86) PCT No.: PCT/KR2006/001280
§ 371 (c)(1),
(2), (4) Date: Sep. 19, 2008

(87) PCT Pub. No.: WO2006/107181
PCT Pub. Date: Oct. 12, 2006

(65) Prior Publication Data
US 2009/0157816 A1 Jun. 18, 2009

(30) Foreign Application Priority Data
Apr. 8, 2005 (IN) .............................. 399/CHE/2005

(51) Int. Cl.
G06F 15/16 (2006.01)
G01J 3/28 (2006.01)
(52) U.S. Cl.
USPC ............................ 709/206; 709/227; 709/230
(58) Field of Classification Search
USPC ......................................... 709/229, 230, 206
See application file for complete search history.

(56) References Cited

U.S. PATENT DOCUMENTS 7,561,595 B2 * 7/2009 Garcia-Martin et al. ..... 370/465
2002/0087704 A1 * 7/2002 Chesnais et al. .............. 709/228
2003/0073450 A1 * 4/2003 Laumen et al. ............... 455/466
2003/0193967 A1 10/2003 Fenton et al.
2004/0214588 A1 10/2004 Tanimoto (Continued)

FOREIGN PATENT DOCUMENTS

JP 2001-245016 9/2001
JP 2003-258879 9/2003

(Continued)

OTHER PUBLICATIONS

Fielding, R., RFC 2068—Hypertext Transfer Protocol—HTTP/1.1. Network Working Group, Jan. 1997.*

(Continued)

Primary Examiner — Ian N Moore
Assistant Examiner — Thai Nguyen
(74) Attorney, Agent, or Firm — The Farrell Law Firm, P.C.

(57) ABSTRACT

Provided is a system for delivering an instant message in which instant messaging systems of different types interwork. The system includes a transmitter mobile communication terminal and an interworking server. The transmitter mobile communication terminal connected to a first instant messaging system transmits a request for an instant message receipt report to a receiver mobile communication terminal connected to a second instant messaging system. The interworking server converts the delivery format of the instant message into another suitable for the second instant messaging system and transmits the instant message to the receiver mobile communication terminal. The interworking server also converts the delivery format of the instant message receipt report generated according to the receipt result of the instant message by the receiver mobile communication terminal after completion of the delivery of the instant message to the receiver mobile communication terminal into another suitable for the delivery format of the first instant messaging system to which the transmitter mobile communication terminal is connected, and transmits the instant message receipt report to the transmitter mobile communication terminal.

10 Claims, 11 Drawing Sheets

U.S. PATENT DOCUMENTS

| | | | |
|---|---|---|---|
| 2004/0254992 A1* | 12/2004 | Kiss et al. | 709/206 |
| 2005/0033852 A1* | 2/2005 | Tenhunen | 709/229 |
| 2005/0105511 A1* | 5/2005 | Poikselka | 370/352 |
| 2005/0213537 A1* | 9/2005 | Ingimundarson et al. | 370/329 |

FOREIGN PATENT DOCUMENTS

| | | |
|---|---|---|
| JP | 2004-326318 | 11/2004 |
| JP | 2004-362236 | 12/2004 |
| KR | 1020030086763 | 11/2003 |
| KR | 1020040073888 | 8/2004 |

OTHER PUBLICATIONS

J. Rosenberg, "Advanced Instant Messaging Requirements for the Session Initiation Protocol (SIP) Draft-Rosenberg-Simple-Messaging-Requirements-01", Feb. 12, 2004.

H. Khartabil, "Instant Message Delivery and Read Reports Draft-Khartabil-Simple-IM-Report-00", May 4, 2005.

Shiao-Li Tsao et al., "Inter-Working and Integration of Messaging Services in a Heterogeneous Wireless Environment", 2005.

B. Campbell et al., "The Message Session Relay Protocol; draft-ietf-simple-message-sessions-10.txt", Simple WG, Feb. 20, 2005.

Open Mobile Alliance, WV-SIP/SIMPLE Interworking Function Architecture, Draft Version, 0.1, OMA-AD_WV_SIMPLE_IWF-V0_1-20040923-D, Sep. 23, 2004.

B. Campbell et al., "Session Initiation Protocol Extension for Instant Messaging; draft-ietf-sip-message-07", Network Working Group, Sep. 14, 2002.

* cited by examiner

SYSTEM AND METHOD FOR INSTANT MESSAGE TRANSMISSION IN MOBILE COMMUNICATION TERMINAL

PRIORITY

This application claims priority to Indian Patent Application Number 399/CHE/2005, which was filed Apr. 8, 2005, and to PCT application number PCT/KR2006/001280, which was filed Apr. 7, 2006, the entire disclosure of each of which is incorporated herein by reference.

TECHNICAL FIELD

The present invention generally relates to mobile communication technology, and in particular, to an instant messaging method and system.

BACKGROUND ART

Open Mobile Alliance (OMA), which is developing a mobile application standard for instant messaging, supports two means for exchanging instant messages, one of which is based on legacy Interpersonal Messaging System (IMPS) technology and the other of which is based on Session Initiation Protocol for Instant Messaging and Presence Leveraging Extensions (SIP/SIMPLE) technology. Instant messaging systems using the two means can interwork.

In IMPS, a user who sends an instant message may request an instant message delivery report including information about the receipt status of the instant message by a recipient. In a Boolean field, a primitive including an instant message delivery report request of the user, i.e., a sender mobile communication terminal, is a "Send Message Request" and a primitive including the instant message delivery report is a "Delivery Report Request" primitive, which are shown in FIGS. 1 and 2. FIG. 1 illustrates an instant message delivery report requesting process in general IMPS, and FIG. 2 illustrates an instant message delivery reporting process in general IMPS. If a mobile communication terminal 10 sends an instant message delivery report request to an IMPS server 20 using the "Send Message Request" primitive when sending an instant message in step 101, the IMPS server 20 sends a "Send Message Response" primitive to the mobile communication terminal 10 in response to the "Send Message Request" primitive in step 103. The IMPS server 20 then sends the instant message to a recipient mobile communication terminal and sends the "Delivery Report Request" primitive including information about the receipt status of the instant message by the recipient mobile communication terminal and a reason for a failure in the receipt of the instant message to the sender mobile communication terminal 10 in step 105. The sender mobile communication terminal 10 sends a "Status" primitive to the IMPS server 20 in response to the "Delivery Report Request" primitive in step 107.

FIGS. 3 through 7 illustrate embodiments in various scenarios of an instant message delivery reporting process. FIG. 3 illustrates an instant message delivery reporting process when the receipt of an instant message is successful in general IMPS. In FIG. 3, the instant message is delivered without notification.

If a first mobile communication terminal 30, which is a sender mobile communication terminal, sends an instant message delivery request and a "Send Message Request" primitive including an instant message delivery report request to an IMPS server 20 in step 109, the IMPS server 20 sends a "Send Message Response" primitive to the first mobile communication terminal 30 in response to the "Send Message Request" primitive in step 111. The IMPS server 20 then sends a "New Message" primitive to a second mobile communication terminal 40, which is a recipient mobile communication terminal, to send the instant message in step 113. The second mobile communication terminal 40 which receives the instant message sends a "Message Delivered" primitive to the IMPS server 20 to indicate that the instant message is successfully delivered in step 115. The IMPS server 20 sends a response code indicating that the instant message is successfully received to the first mobile communication terminal 30 through a "Delivery Report Request" primitive in step 117 and the first mobile communication terminal 30 sends the "Status" primitive to the IMPS server 20 in response to the "Delivery Report Request" primitive in step 119.

FIG. 4 illustrates an instant message delivery reporting process in Notify/Get instant message delivery in general IMPS. In FIG. 4, an instant message is delivered with notification.

If the first mobile communication terminal 30, which is a sender mobile communication terminal, sends a "Send Message Request" primitive including an instant message delivery report request in step 121, the IMPS server 20 sends a "Send Message Response" primitive to the first mobile communication terminal 30 in response to the "Send Message Request" primitive in step 123. Since the delivery method is set to "Notify/Get" by the second mobile communication terminal 40 that is a recipient mobile communication terminal, the IMPS server 20 notifies the second mobile communication terminal 40 of the existence of an instant message to be received, through a "Message Notification" primitive in step 125. The second mobile communication terminal 40 sends a "Status" primitive to the IMPS server 20 in response to the "Message Notification" primitive in step 127 and requests the instant message to be received, through a "Get Message Request" primitive in step 129. The IMPS server 20 sends a "Get Message Response" primitive including the instant message to be received to the second mobile communication terminal 40 in step 131. Upon receipt of the "Get Message Response" primitive, the second mobile communication terminal 40 sends a "Message Delivered" primitive indicating the instant message is successfully received, to the IMPS server 20 in step 133. The IMPS server 20 sends the "Status" primitive to the second mobile communication terminal 40 in response to the "Message Delivered" primitive in step 135 and sends a response code indicating that the instant message is successfully received through a "Delivery Report Request" primitive in step 137. The first mobile communication terminal 30 sends the "Status" primitive to the IMPS server 20 in response to the "Delivery Report Request" primitive in step 139.

FIG. 4 illustrates another instant message delivery reporting process in Notify/Get instant message delivery in general IMPS. In FIG. 4, an instant message is requested using a "Forward Message Request" primitive in response to notification. Steps 141 through 147 of FIG. 5 are similar to steps 121 through 127 of FIG. 4.

The second mobile communication terminal 40 that receives a "Message Notification" primitive sends the "Forward Message Request" primitive to the IMPS server 20 in step 149 to request an instant message to be received. The IMPS server 20 sends a "Status" primitive including the instant message to be received to the second mobile communication terminal 40 in step 151 and sends a response code indicating that the instant message is successfully received through a "Delivery Report Request" primitive in step 153. The first mobile communication terminal 30 sends the "Status" primitive to the IMPS server 20 in response to the "Delivery Report Request" primitive in step 155.

FIG. 6 illustrates an instant message delivery reporting process when the receipt of an instant message is rejected in general IMPS. Steps 157 through 163 of FIG. 6 are similar to steps 121 through 127 of FIG. 4. The second mobile communication terminal 40 that receives a "Message Notification" primitive sends a "Reject Message Request" primitive for rejecting the receipt of the instant message to the IMPS server 20 in step 165. The IMPS server 20 sends a "Status" primitive to the second mobile communication terminal 40 in response to the "Reject Message Request" in step 167 and sends a response code indicating the receipt of the instant message is rejected, to the first mobile communication terminal 30 through a "Delivery Report Request" primitive in step 169. The first communication terminal 30 sends the "Status" primitive to the IMPS serve 20 in response to the "Delivery Report Request" primitive in step 171.

FIG. 7 illustrates an instant message delivery reporting process when the validity of an instant message expires in general IMPS. Steps 173 and 175 of FIG. 7 are similar to steps 121 and 123 of FIG. 4. If the recipient mobile communication terminal 40 is not reachable for some reasons like out-of-network coverage, the IMPS server 20 may fail to deliver the instant message within the message validity. Once recognizing that the validity of the instant message expires in step 177, the IMPS server 20 proceeds to step 179 without any notification to the second mobile communication terminal 40. At this time, the second mobile communication terminal 40 cannot receive the instant message, i.e., is not reachable. The IMPS server 20 sends a response code indicating that the validity of the instant message expires to the first mobile communication terminal 30 through a "Delivery Report Request" primitive in step 179. The first mobile communication terminal 30 sends a "Status" primitive to the IMPS server 20 in response to the "Delivery Report Request" primitive in step 181.

As such, in an instant messaging service according to IMPS, when a sender terminal requests an instant message delivery report, a delivery report including information about the receipt status of an instant message and a reason for a failure in the receipt of the instant message is sent. The delivery report may include a response code like Message queue full, Recipient user/group does not exist, and Recipient user blocked the sender, in addition to Successfully received, Receipt rejected, and Validity expires.

In SIP/SIMPLE, a user who sends an instant message does not explicitly request an instant message delivery report. However, a response code indicating the receipt status of the instant message by a recipient mobile communication terminal is included in a response message to an instant message delivery request. Referring to FIG. 8, if the first mobile communication terminal 30 which is a sender mobile communication terminal sends a "Message" primitive requesting an instant message delivery to an SIP/SIMPLE server 50 in step 183, the SIP/SIMPLE server 50 sends the instant message through the "DR Message" primitive to the second mobile communication terminal 40 which is a recipient mobile communication terminal in step 185. Upon receipt of the "Message" primitive, the second mobile communication terminal 40 sends a "Response Code" primitive to the SIP/SIMPLE server 50 in response to the "Message" primitive in step 187. The SIP/SIMPLE server 50 sends information corresponding to the instant message delivery report through response codes as below to the first mobile communication terminal 30 through the "Response Code" primitive in step 189.

The response codes may be:
200 OK—Successful
202—Accepted
3xx—Redirection
4xx—Request failure
5xx—Server failure
6xx—Global failure The 202 Accepted response code is generated when the instant message is delivered to a gateway, a store and forward server, or other services that may deliver the instant message. As a result, it is not desirable to make an assumption that the instant message is delivered to a final destination when the first mobile communication terminal 30 receives the 202 Accepted response code. However, after sending the 202 Accepted response code, the SIP/SIMPLE server 50 does not generate an additional response code regardless of the success or failure in the delivery of the instant message. As a result, the first mobile communication terminal 30 cannot confirm the receipt status of the instant message when receiving the 202 Accepted response code.

Moreover, although IMPS and SIP/SIMPLE can perform instant message delivery reporting processes, in the case of an instant messaging system in which IMPS and SIP/SIMPLE interwork, the instant message delivery reporting processes of IMPS and SIP/SIMPLE are not compatible with each other. As a result, a sender mobile communication terminal cannot confirm the receipt status of the instant message by a recipient mobile communication terminal.

DISCLOSURE OF THE INVENTION

It is, therefore, an object of the present invention to provide an instant messaging method and system to facilitate instant message delivery reporting in an instant messaging system where IMPS and SIP/SIMPLE interwork.

It is another object of the present invention to provide an instant messaging method and system for accurate instant message delivery reporting in an instant messaging system supporting SIP/SIMPLE.

According to one aspect of the present invention, there is provided an instant messaging method in a Session Initiation Protocol for Instant Messaging and Presence Leveraging Extensions (SIP/SIMPLE) instant messaging system. The instant messaging method includes the steps of a sender mobile communication terminal generating an instant message delivery report request in the delivery of an instant message, if a delay in the delivery of the instant message occurs, waiting without sending an instant message delivery report until the receipt status of the instant message by a recipient mobile communication terminal is determined; and if the determination is made, generating the instant message delivery report including information about the receipt status of the instant message and sending the instant message delivery report to the sender mobile communication terminal.

According to another aspect of the present invention, there is provided an instant messaging method in an instant messaging system where two instant messaging systems of different types interwork. The instant messaging method includes the steps of a sender mobile communication terminal connected to one of the two instant messaging systems generating an instant message delivery report request to a recipient mobile communication terminal connected to the other instant messaging system, converting the delivery format of an instant message into another suitable for the other instant messaging system and delivering the instant message to the recipient mobile communication terminal, upon completion of the delivery of the instant message to the recipient mobile communication terminal, generating an instant message delivery report including information about the receipt status of the instant message by the recipient mobile communication terminal, and converting the delivery format of the instant message delivery report to another suitable for the system to which the sender mobile communication terminal is connected and sending the instant message delivery report to the sender mobile communication terminal.

According to further another aspect of the present invention, there is provided a Session Initiation Protocol for Instant Messaging and Presence Leveraging Extensions (SIP/SIMPLE) instant messaging system. The SIP/SIMPLE instant messaging system includes a sender mobile communication terminal for generating an instant message delivery report request in the delivery of an instant message and an SIP/SIMPLE server for waiting without sending an instant message delivery report until the receipt status of the instant message by a recipient mobile communication terminal is determined, if a delay in the delivery of the instant message occurs, and if the determination is made, generating the instant message delivery report including information about the receipt status of the instant message and sending the instant message delivery report to the sender mobile communication terminal.

According to yet another aspect of the present invention, there is provided an instant messaging system in which instant messaging systems of different types interwork. The instant messaging system includes a sender mobile communication terminal connected to one of the instant messaging systems for generating an instant message delivery report request to a recipient mobile communication terminal connected to the other instant messaging system and an interworking server for converting the delivery format of an instant message into another suitable for the other instant messaging system, delivering the instant message to the recipient mobile communication terminal, generating an instant message delivery report including information about the receipt status of the instant message by the recipient mobile communication terminal upon completion of the delivery of the instant message to the recipient mobile communication terminal, converting the delivery format of the instant message delivery report to another suitable for the system to which the sender mobile communication terminal is connected, and sending the instant message delivery report to the sender mobile communication terminal.

BRIEF DESCRIPTION OF THE DRAWINGS

The above and other objects, features and advantages of the present invention will become more apparent from the following detailed description when taken in conjunction with the accompanying drawings in which.

BEST MODE FOR CARRYING OUT THE INVENTION

Preferred embodiments of the present invention will now be described in detail with reference to the annexed drawings. In the following description, a detailed description of known functions and configurations incorporated herein has been omitted for conciseness.

Figure 1:
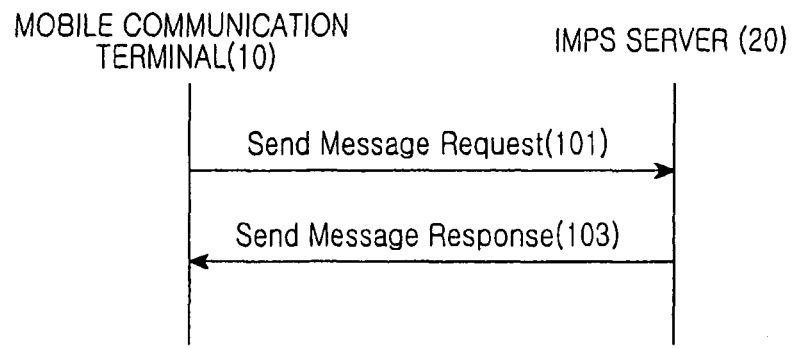
FIG. 1 illustrates an instant message delivery report requesting process in general IMPS.
Figure 2:
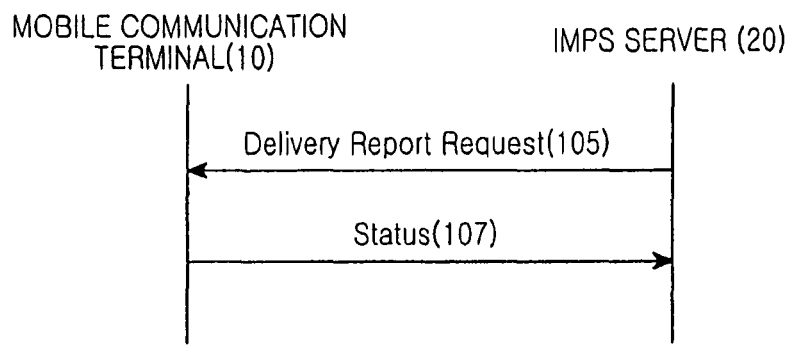
FIG. 2 illustrates an instant message delivery reporting process in general IMPS.
Figure 3:
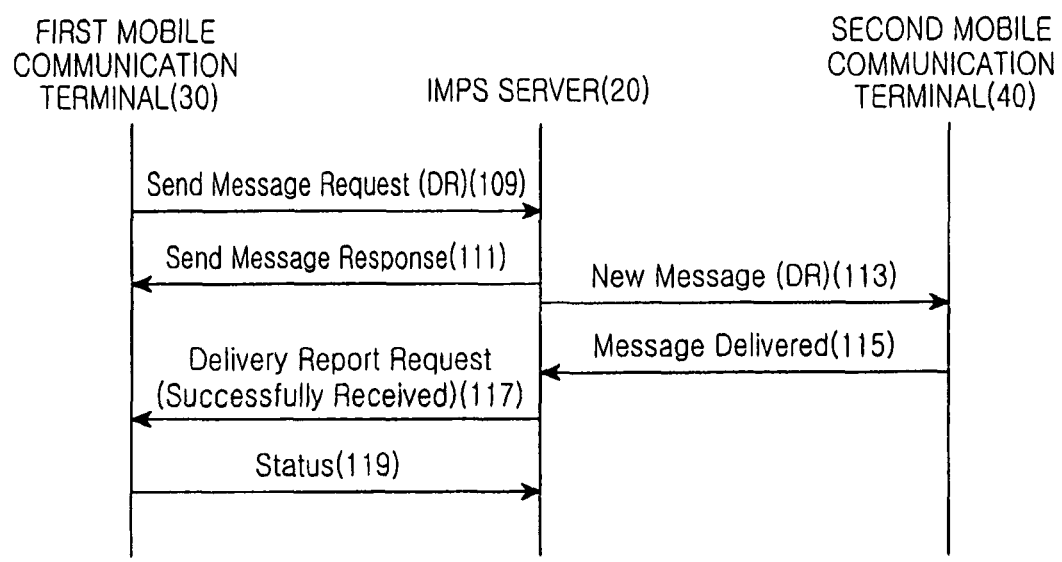
FIG. 3 illustrates an instant message delivery reporting process when the receipt of an instant message is successful in general IMPS.
Figure 4:
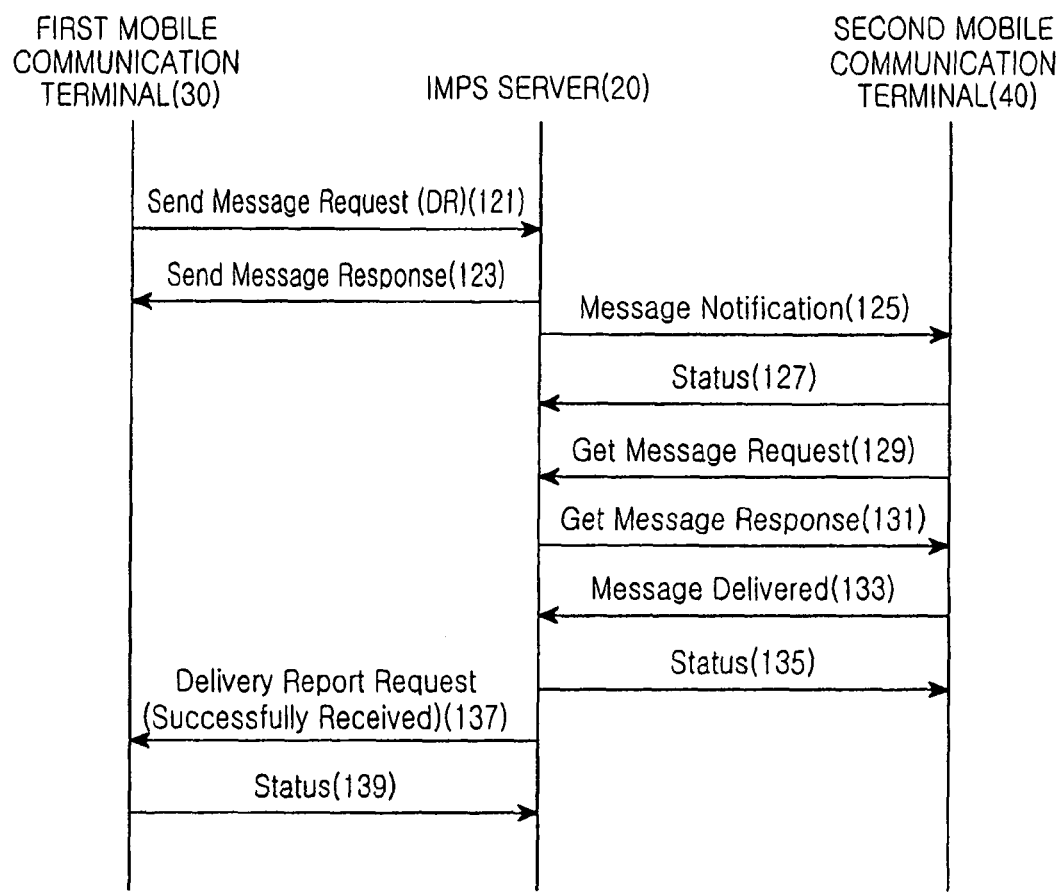
FIG. 4 illustrates an instant message delivery reporting process in Notify/Get instant message delivery in general IMPS.
Figure 5:
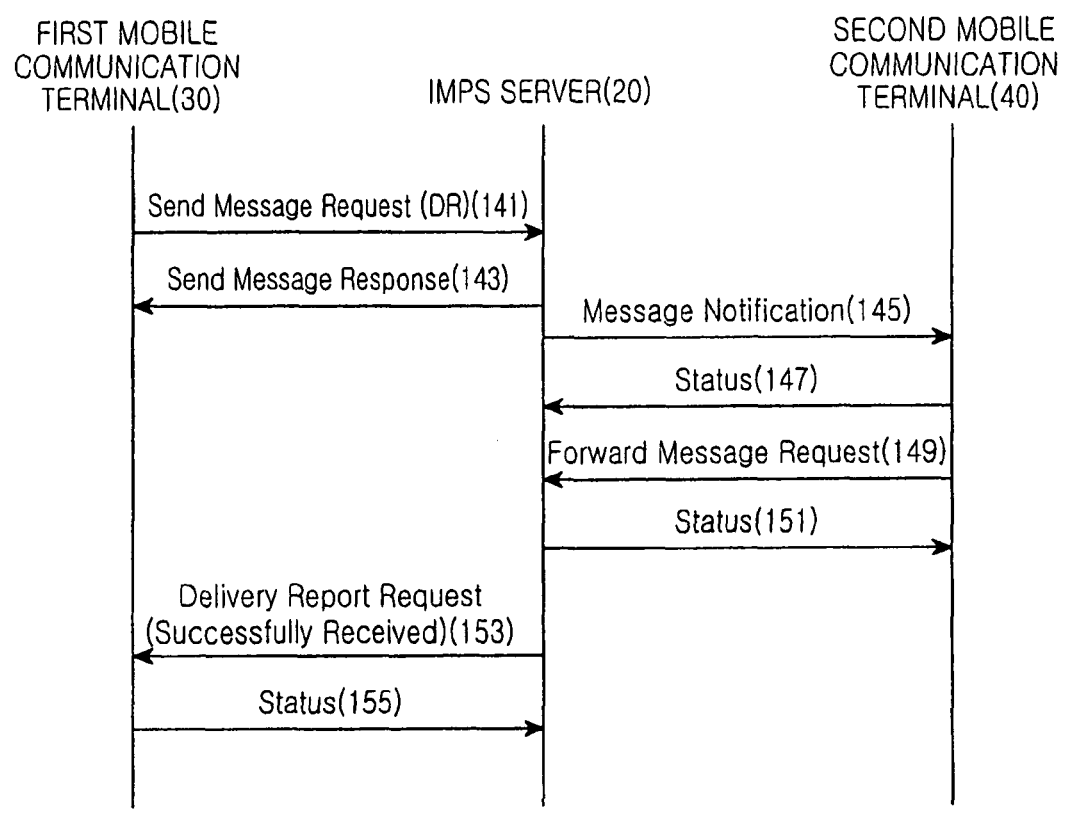
FIG. 5 illustrates another instant message delivery reporting process in Notify/Get instant message delivery in general IMPS.
Figure 6:
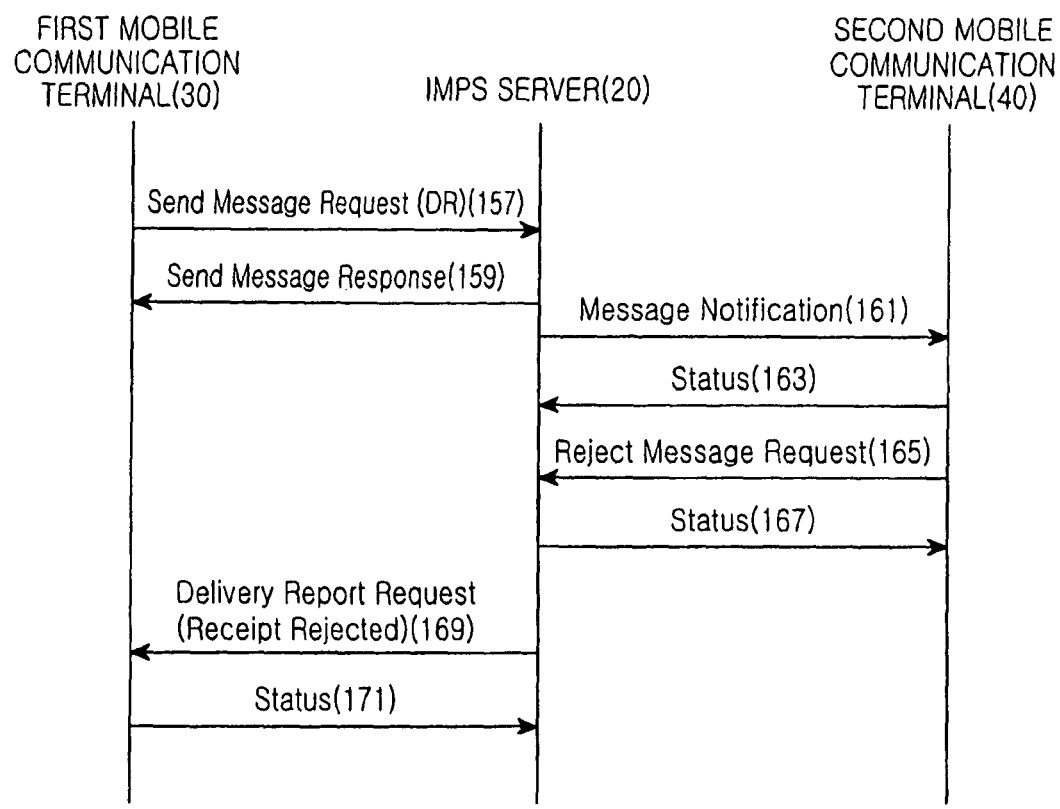
FIG. 6 illustrates an instant message delivery reporting process when the receipt of an instant message is rejected in general IMPS.
Figure 7:
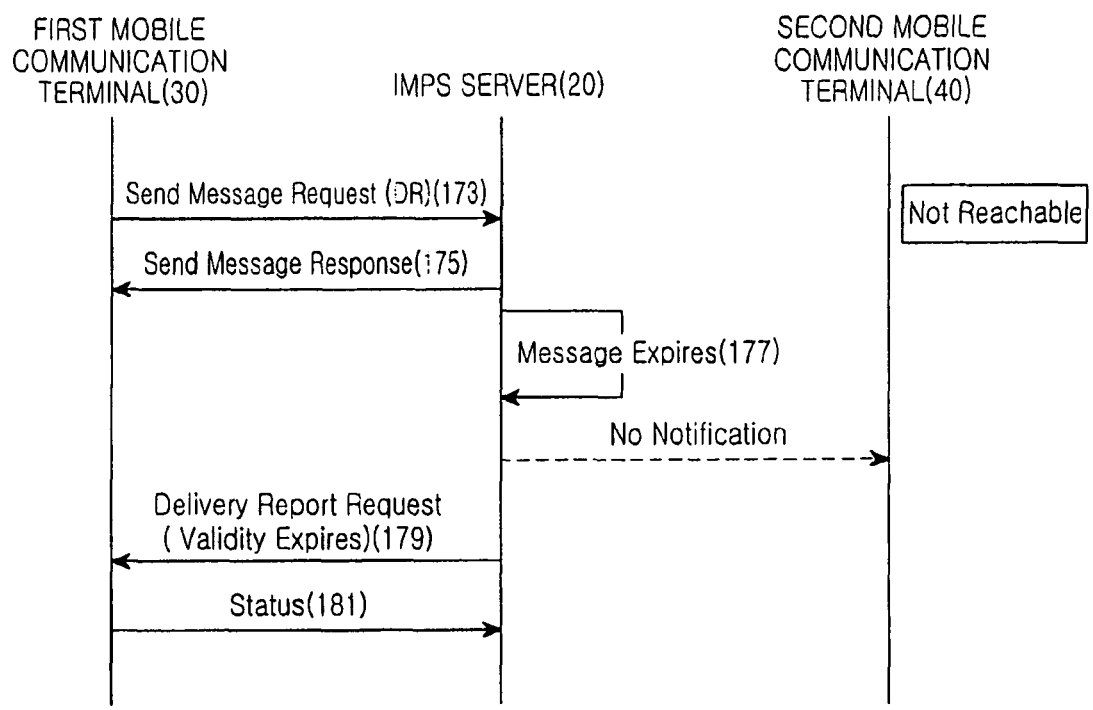
FIG. 7 illustrates an instant message delivery reporting process when the validity of an instant message expires in general IMPS.
Figure 8:
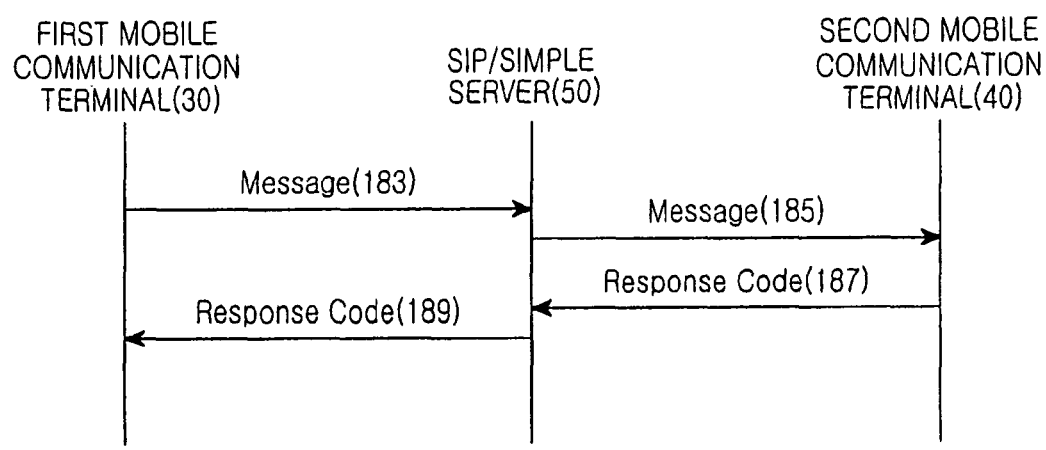
FIG. 8 illustrates an instant messaging process in general SIP/SIMPLE.
Figure 9:
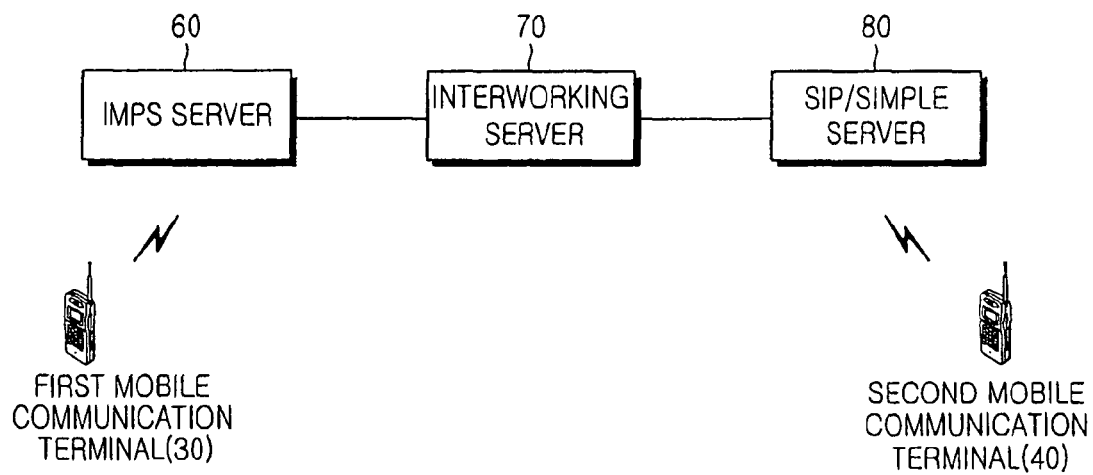
FIG. 9 illustrates an instant messaging system according to the present invention.

In an instant messaging system according to an embodiment of the present invention, an IMPS system and a SIP/SIMPLE system interwork. FIG. 9 illustrates an instant messaging system according to an embodiment of the present invention. Referring to FIG. 9, the instant messaging system includes an IMPS server 60, an interworking server 70, a SIP/SIMPLE server 80, and a plurality of mobile communication terminals including a first mobile communication terminal 30 and a second mobile communication terminal 40.

The IMPS server 60 provides an instant messaging service according to IMPS. The IMPS server 60 operates in a similar way to a general IMPS server. However, according to an embodiment of the present invention, if an instant message delivery request is generated from a mobile communication terminal included in a service coverage of the SIP/SIMPLE server 80, the requested instant message is sent to the interworking server 70 and the instant message received from the interworking server 70 is sent to the mobile communication terminal. When the mobile communication terminal included in the service coverage of the SIP/SIMPLE server 80 generates an instant message delivery report request, the IMPS server 60 sends the collected instant message delivery report to the interworking server 70 after completion of the delivery of the instant message. The IMPS server 60 sends the instant message delivery report received from the interworking server 70 to the mobile communication terminal. The instant message delivery report request is generated for a sender mobile communication terminal to request information about the receipt status of the instant message by a recipient mobile communication terminal or a reason for a failure in the receipt of the instant message. The completion of the delivery of the instant message includes not only the successful receipt of the instant message by the recipient mobile communication terminal but also an explicit failure in the delivery of the instant message for some reasons like Validity expires, Receipt rejected, or System failure. The IMPS server 60 generates the instant message delivery report in response to a "Message Request" primitive of the recipient mobile communication terminal and the delivery report may include a response code such as Message queue full, Recipient user/group does not exist, or Recipient user blocked the sender in addition to Successfully received, Receipt rejected, and Validity expires. The IMPS server 60 sends the instant message delivery report through a "Delivery Report Request" primitive.

The SIP/SIMPLE server 80 provides a SIP/SIMPLE instant messaging service. The SIP/SIMPLE server 80 operates in a similar way to a general SIP/SIMPLE server. However, according to an embodiment of the present invention, if an instant message delivery request is generated from a mobile communication terminal included in a service coverage of the IMPS server 60, the requested instant message is sent to the interworking server 70 and the instant message received from the interworking server 70 is sent to the mobile communication terminal. If the recipient mobile communication terminal included in the service coverage of the SIP/SIMPLE server 80 is not reachable in the delivery of the instant message, the SIP/SIMPLE server 80 generates a 202 Accepted response code and sends the same to the sender mobile communication terminal. At this time, the 202 Accepted response code may include an appropriate warning. Thereafter, if the recipient mobile communication terminal becomes reachable and the instant message is sent, the SIP/SIMPLE server 80 sends the instant message delivery report to the sender mobile communication terminal through a "Message" primitive. The SIP/SIMPLE server 80 generates the instant message delivery report in response to a response code included in a "Response Code" primitive sent by the recipient mobile communication terminal in response to the "Message" primitive.

The response codes may be as follows:
- 200 OK —Successful
- 202—Accepted
- 3xx —Redirection
- 4xx —Request failure
- 5xx —Server failure
- 6xx —Global failure The 202 Accepted response code may be generated when the instant message is delivered to a gateway, a store and forward server, or other services that may deliver the instant message. Even when the 202 Accepted response code is generated due to the foregoing case, the SIP/SIMPLE server 80 sends the instant message delivery report to the sender mobile communication terminal included in the service coverage of the SIP/SIMPLE server 80 through the "Message" primitive upon confirming completion of the delivery of the instant message to the recipient mobile communication terminal. The completion of the delivery of the instant message includes not only the successful receipt of the instant message by the recipient mobile communication terminal but also an explicit failure in the delivery of the instant message for some reasons like Validity expires, Receipt rejected, or System failure. If a terminal requesting an instant message delivery report service is included in the service coverage of the IMPS server 60, the SIP/SIMPLE server 80 sends a "Response Code" primitive sent by the recipient mobile communication terminal in response to the "Message" primitive to the interworking server 70.

The interworking server 70 matches services of the IMPS server 60 and the SIP/SIMPLE server 80 to allow the IMPS server 60 and the SIP/SIMPLE server 80 to be compatible with each other. In particular, the interworking server 70 matches a primitive generated by instant message delivery reporting of the IMPS server 60 and a primitive generated by an instant message delivery reporting of the SIP/SIMPLE server 80 and substitutes the primitives for one that can be supported by each of the IMPS server 60 and the SIP/SIMPLE server 80. Thus, the interworking server 70 previously stores response code information that can be included in the "Response Code" primitive of the SIP/SIMPLE server 80, corresponding to an instant message delivery report that can be included in the "Deliver Report Request" primitive of the IMPS server 60.

Each of the first mobile communication terminal 30 and the second mobile communication terminal 40 can provide both an IMPS instant messaging service and a SIP/SIMPLE instant messaging service.

Figure 10:
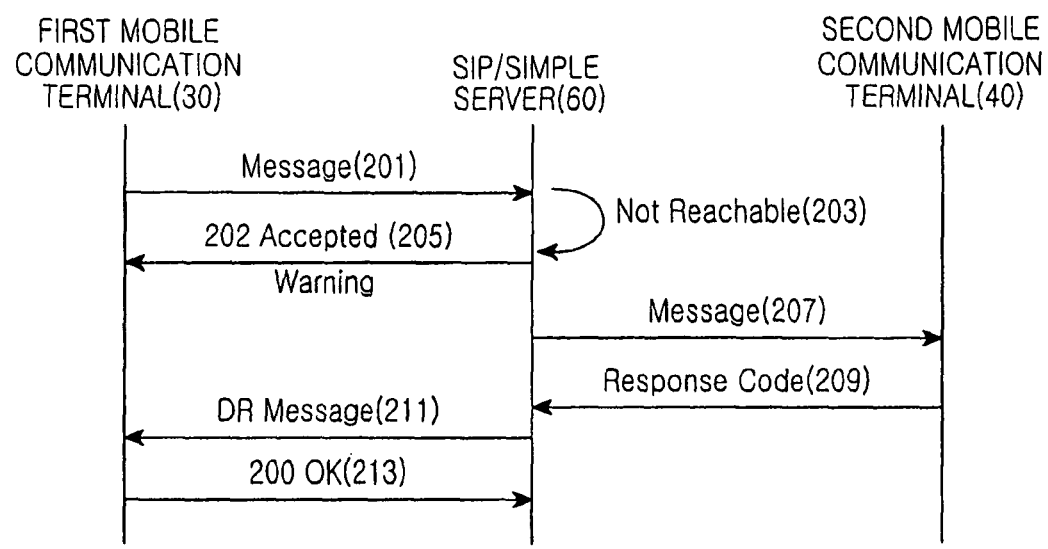
FIG. 10 illustrates an instant messaging delivery reporting process in an SIP/SIMPLE system according to an embodiment of the present invention.

Hereinafter, an instant message delivery reporting process in the instant messaging system according to the present invention will be described with reference to FIGS. 10 through 12. First, when both a sender mobile communication terminal and a recipient mobile communication terminal exist in the service coverage of the SIP/SIMPLE server 80 and the 202 Accepted response code is generated, the SIP/SIMPLE server 80 performs instant message delivery reporting as follows. FIG. 10 illustrates an instant message delivery reporting process in an SIP/SIMPLE system according to an embodiment of the present invention. The first mobile communication terminal 30 is the sender mobile communication terminal and the second mobile communication terminal 40 is the recipient mobile communication terminal, both of which exist in the service coverage of the SIP/SIMPLE server 80 and provide a SIP/SIMPLE instant messaging service.

Referring to FIG. 10, the first mobile communication terminal 30 sends a "Message" primitive requesting an instant message delivery to the SIP/SIMPLE Server 80 in step 201. The "Message" primitive includes an instant message delivery report request. At this time, the first mobile communication terminal 30 may make settings by a user input such that the "Message" primitive includes header information as follows.

TABLE 1

| Field | Information |
| --- | --- |
| MESSAGE sip | user-2@domain.com SIP/2.0 |
| Max - Forwards | 70 |
| From | sip:user-1@domain.com;tag=49583 |
| To | sip:user-2@domain.com |
| Call - ID | asd88asd77a@1.2.3.4 |
| CSeq | 1 MESSAGE |
| Content - Type | text/plain |
| Content - Length | 20 |
| Content | Hello, Good morning. |

The SIP/SIMPLE server 80 that receives the "Message" primitive recognizes that the received "Message" primitive includes the instant message delivery report request. The SIP/SIMPLE server 80 finds that a delivery delay occurs because the instant message cannot be transmitted to the second mobile communication terminal 40 in step 203 and goes to step 205. In other words, the SIP/SIMPLE server 80 looks up for the second mobile communication terminal 40 in its database (created through registrations) and finds that the second mobile communication terminal 40 is not reachable because of some reasons. The SIP/SIMPLE server 80 goes to step 205 in the case of the delivery delay and sends the 202 Accepted response code to the first mobile communication terminal 30. The SIP/SIMPLE server 80 then checks if the instant message is finally delivered to the second mobile communication terminal 40, and has to generate the instant message delivery report.

The 202 Accepted response code generated in step 205 may include an appropriate "warning" code in a header field of the SIP response primitive. For example, the header field "warning" may have the note "Delivery report awaited". The warning code may be within 390 to 399 as specified in RFC3261. Thus, The 202 Accepted response code (SIP/2.0 202 Accepted) sent in step 205 may include header information as follows.

TABLE 2

| Field | Information |
| --- | --- |
| SIP/2.0 | 202 Accepted |
| Max - Forwards | 70 |
| From | sip:user-1@domain.com;tag=49583 |
| To | sip:user-2@domain.com |
| Call - ID | asd88asd77a@1.2.3.4 |
| CSeq | 1 MESSAGE |
| Content - Type | text/plain |
| Content - Length | 0 |
| Warning | 395 "Delivery report awaited" |

When the second mobile communication terminal 40 becomes reachable, the SIP/SIMPLE server 80 delivers the instant message to the second mobile communication terminal 40 through the "Message" primitive in step 207. At this time, the "Message" primitive may include header information as follows.

TABLE 3

| Field | Information |
| --- | --- |
| MESSAGE sip | user-2@domain.com SIP/2.0 |
| Max - Forwards | 69 |
| From | sip:server@domain.com;tag=49394 |
| To | sip:user-2@domain.com |
| Call - ID | asd88asd77a@1.2.3.4 |
| CSeq | 1 MESSAGE |
| Content - Type | text/plain |
| Content - Length | 20 |
| Content | Hello, Good morning. |

Upon receipt of the "Message" primitive, the second mobile communication terminal 40 sends the "Response Code" primitive including the 200 OK response code to the SIP/SIMPLE server 80 in step 209. At this time, the "Response Code" primitive may include header information as follows.

TABLE 4

| Field | Information |
| --- | --- |
| SIP/2.0 | 200 OK |
| From | sip:server@domain.com;tag=49394 |
| To | sip:user-2@domain.com;tag=ab8asdasd9 |
| Call - ID | asd88asd77a@1.2.3.4 |
| CSeq | 1 MESSAGE |
| Content - Length | 0 |

Since the first mobile communication terminal 30 has requested the instant message delivery report, the SIP/SIMPLE server 80 sends the "DR Message" primitive including the instant message delivery report indicating the instant message is successfully received, to the first mobile communication terminal 30 in step 211. The "DR Message" primitive may include header information as follows.

TABLE 5

| Field | Information |
| --- | --- |
| MESSAGE sip | user-1@domain.com SIP/2.0 |
| Max - Forwards | 70 |

TABLE 5-continued

| Field | Information |
| --- | --- |
| From | sip:server@domain.com;tag=49583 |
| To | sip:user-1@domain.com |
| Call - ID | asd88asd77a@1.2.3.4 |
| CSeq | 1 MESSAGE |
| Content - Type | text/plain |
| Content - Length | 27 |
| Content | Message delivered to User-2. |

The first mobile communication terminal 30 sends the 200 OK response code including header information as follows in response to the "DR Message" primitive.

TABLE 6

| Field | Information |
| --- | --- |
| SIP/2.0 | 200 OK |
| From | sip:server@domain.com;tag=49583 |
| To | sip:user-1@domain.com;tag=ab8asdasd9 |
| Call - ID | asd88asd77a@1.2.3.4 |
| CSeq | 1 MESSAGE |
| Content - Length | 0 |

As described above, when the recipient mobile communication terminal included in the service coverage of the SIP/SIMPLE server 80 is not reachable in the delivery of the instant message, the SIP/SIMPLE server 80 generates the 202 Accepted response code and sends the 202 Accepted response code to the sender mobile communication terminal. The 202 Accepted response code may include an appropriate warning. If the recipient mobile communication terminal becomes reachable and the instant message is successfully delivered to the recipient mobile communication terminal, the SIP/SIMPLE server 80 sends the instant message delivery report indicating the instant message is successfully delivered, to the sender mobile communication terminal through the "DR Message" primitive. Although the 202 Accepted response code is generated when the second mobile communication terminal 40 is not reachable for some reasons in the foregoing example, the process described above is also applied to a case when the 202 Accepted response code is generated according to a provision of SIP/SIMPLE.

Hereinafter, an instant message delivery reporting process in an instant messaging system where the sender mobile communication terminal is connected to the IMPS server 60 and the recipient mobile communication terminal is connected to the SIP/SIMPLE server 80 will be described with reference to FIG. 11. FIG. 11 illustrates an instant messaging delivery reporting process according to a first embodiment of the present invention in the instant messaging system according to an embodiment of the present invention. The first mobile communication terminal 30 is the sender mobile communication terminal and the second mobile communication terminal 40 is the recipient mobile communication terminal.

Figure 11:
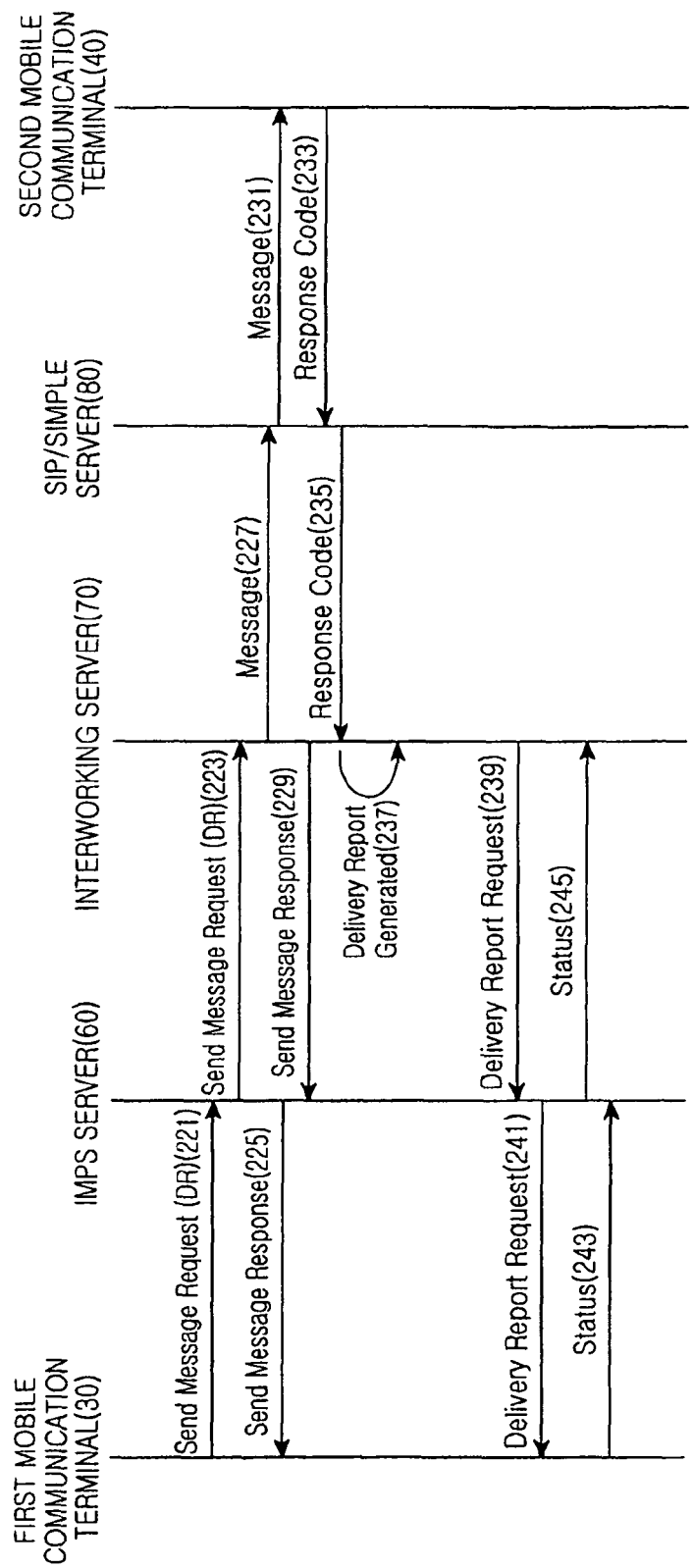
FIG. 11 illustrates an instant messaging delivery reporting process according to a first embodiment of the present invention in an instant messaging system according to an embodiment of the present invention.

Referring to FIG. 11, if the first mobile communication terminal 30 sends the instant message delivery request and the "Send Message Request" primitive including an instant message delivery report request in step 221, the IMPS server 60 sends the received "Send Message Request" primitive to the interworking server 70 in step 223. The IMPS server 60 sends the "Send Message Response" primitive to the first mobile communication terminal 30 in response to the "Delivery Send Report Request" primitive in step 225.

The interworking server 70 that receives the "Send Message Request" primitive generates an SIP/SIMPLE primitive, i.e., the "Message" primitive corresponding to the received "Send Message Request" primitive and sends the "Message" primitive to the SIP/SIMPLE server 80 in step 227. Since the "Send Message Request" primitive includes the instant message delivery report request of the first mobile communication terminal 30, the interworking server 70 has to keep recognizing the instant message delivery report request until receiving the "Response Code" primitive from the SIP/SIMPLE server 80. The SIP/SIMPLE server 80 delivers the instant message to the second mobile communication terminal 40 through the "Message" primitive in step 231. The second mobile communication terminal 40 sends the "Response Code" primitive to the SIP/SIMPLE server 80 in response to the "Message" primitive in step 233. At this time, it is assumed that a response code included in the "Response Code" primitive is the 200 OK response code indicating the instant message is successfully delivered. The SIP/SIMPLE server 80 sends the received "Response Code" primitive to the interworking server 70. The interworking server 70 generates the instant message delivery report corresponding to the 200 OK response code included in the received "Response Code" primitive in step 237 and goes to step 239. In other words, the interworking server 70 may generate the instant message delivery report indicating the instant message is successfully delivered, and send the generated instant message delivery report to the IMPS server 60.

If the SIP/SIMPLE server 80 cannot immediately deliver the instant message to the second mobile communication terminal 40, it may return the 202 Accepted response code to the interworking server 70. In this case, the interworking server 70 may wait without generating the instant message delivery report to be sent to the IMPS server 60 until receiving final confirmation from the SIP/SIMPLE server 80. In other words, the interworking server 70 delays the delivery of the instant message delivery report until completion of the delivery of the instant message.

As another example, the SIP/SIMPLE server 80 may return the "Response Code" primitive including a 603 DECLINE response code to the interworking server 70 because the receipt of the instant message is rejected by the second mobile communication terminal 40. In this case, the interworking server 70 may generate the instant message delivery reporting indicating the receipt of the instant message is rejected, corresponding to the 603 DECLINE response code, and sends the instant message delivery report to the IMPS server 60 through the "Delivery Report Request" primitive.

As still another example, the SIP/SIMPLE server 80 may sends "Response Code" primitive including a 408 REQUEST TIMEOUT response code to the interworking server 70 because of failing to deliver the instant message within the message validity. In this case, the interworking server 70 generates the instant message delivery report indicating the validity of the instant message expires, corresponding to the 408 REQUEST TIMEOUT response code, and sends the instant message delivery report to the IMPS server 60 through the "Delivery Report Request" primitive.

Referring back to FIG. 11, the interworking server 70 sends an IMPS primitive, i.e., the "Delivery Report Request" primitive including the generated instant message delivery report to the IMPS server 60 in step 239. The IMPS server 60 sends the received "Delivery Report Request" primitive to the first mobile communication terminal 30 in step 241. The first mobile communication terminal 30 sends the "Status" primitive to the IMPS server 60 in response to the "Delivery Report Request" primitive in step 243 and the interworking server 70 sends the received "Status" primitive to the IMPS server 60 in step 245.

In IMPS, there is a provision to send an instant message to a list of users and if requested, the instant message delivery report may be expected from all the recipient users. Hence, if the instant message is delivered to at least one SIP/SIMPLE users, the interworking server 70 may receive multiple instant message delivery reports. Upon receipt of the multiple instant message delivery reports, the interworking server 70 generates a corresponding primitive and provides the same to an IMPS user.

Hereinafter, an instant message delivery reporting process in an instant messaging system where the sender mobile communication terminal is connected to the SIP/SIMPLE server 80 and the recipient mobile communication terminal is connected to the IMPS server 60 will be described with reference to FIG. 12. FIG. 12 illustrates an instant messaging delivery reporting process according to a second embodiment of the present invention in the instant messaging system according to an embodiment of the present invention. The first mobile communication terminal 30 is the recipient mobile communication terminal and the second mobile communication terminal 40 is the sender mobile communication terminal.

Figure 12:
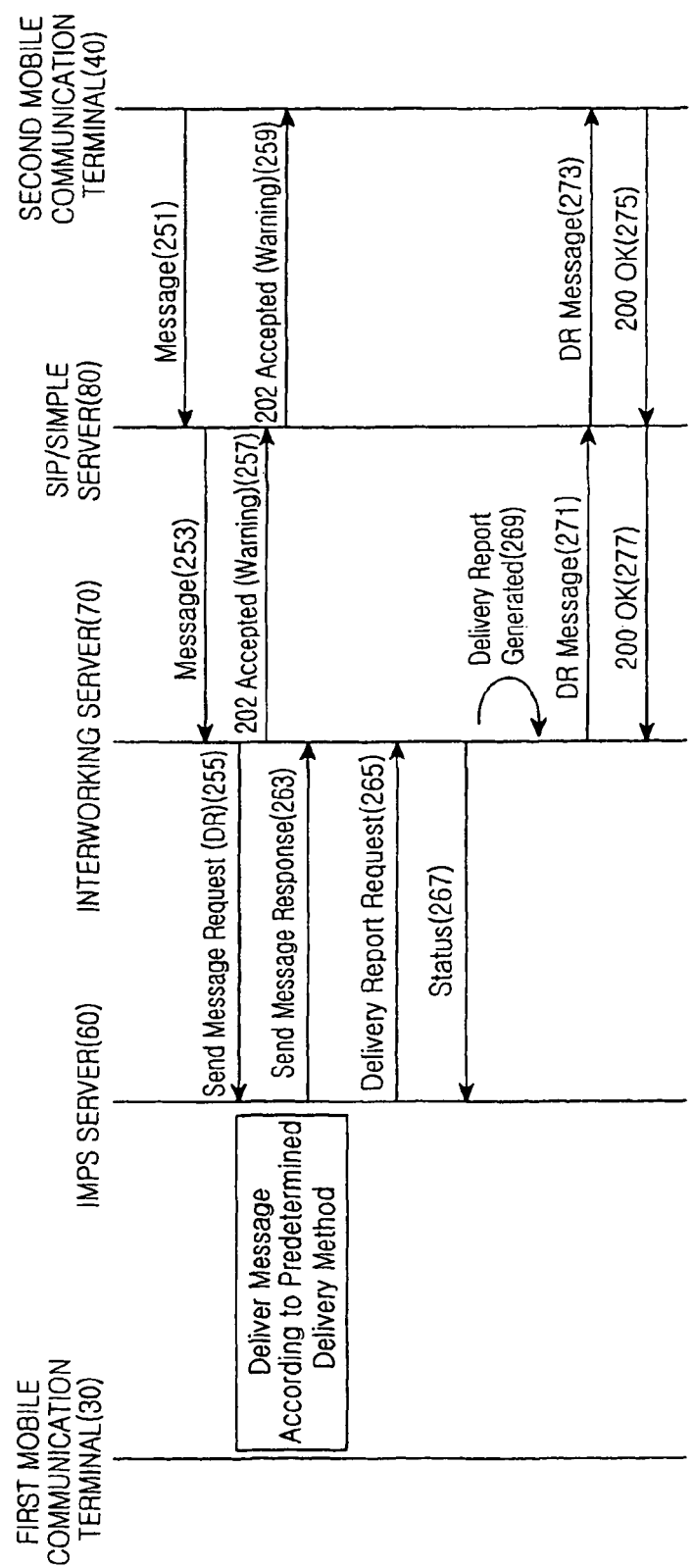
FIG. 12 illustrates an instant messaging delivery reporting process according to a second embodiment of the present invention in an instant messaging system according to an embodiment of the present invention.

Referring to FIG. 12, the second mobile communication terminal 40 sends the "Message" primitive requesting an instant message delivery to the SIP/SIMPLE server 80 in step 251. The "Message" primitive includes the instant message delivery report request. The SIP/SIMPLE server 80 that receives the "Message" primitive sends the "Message" primitive to the interworking server 70 in step 253. The interworking server 70 converts the received "Message" primitive to an IMPS primitive corresponding thereto, i.e., the "Send Message Request" primitive and sends the "Send Message Request" primitive to the IMPS server 60 in step 255. If the receipt of the "Send Message Request" primitive from the IMPS server 60 is delayed, the interworking server 70 sends the 202 Accepted response code to the SIP/SIMPLE server 80 in step 257. The SIP/SIMPLE server 80 sends the 202 Accepted response code to the second mobile communication terminal 40 in step 259.

Upon receipt of the "Send Message Request" primitive in step 255, the IMPS server 60 delivers the instant message to the first mobile communication Terminal 30 in step 261 according to a predetermined delivery method and sends the "Send Message Response" primitive to the interworking server 70 in step 263. Upon completion of the delivery of the instant message, the IMPS server 60 sends the "Delivery Report Request" primitive including the instant message delivery report including information about the receipt status of the instant message by the recipient mobile communication terminal and a reason for a failure in the receipt of the instant message to the interworking server 70 in step 265. For example, the "Delivery Report Request" primitive may include the instant message delivery report such as Successfully delivered, Forward, Receipt rejected, Validity expires, or Recipient user blocked the sender according to the type of Message Request received from the first mobile communication terminal 30. The interworking server 70 sends the "Status" primitive to the IMPS server 60 in response to the "Delivery Report Request" primitive in step 267 and goes to step 269. In step 269, the interworking server 70 looks up for a response code of the SIP/SIMPLE system corresponding to the instant message delivery report included in the received "Delivery Report Request" primitive, generates the "DR Message" primitive including the instant message delivery report corresponding to the found response code, and sends the "DR Message" primitive to the SIP/SIMPLE server 80 in step 271. The SIP/SIMPLE server 80 sends the received "DR Message" primitive to the second mobile communication terminal 40 in step 273.

As described above, according to the present invention, an instant messaging method and system capable of facilitating instant message delivery reporting can be provided in an instant messaging system in which IMPS and SIP/SIMPLE interwork. Moreover, an instant messaging method and system for accurate instant message delivery reporting can be provided in an instant messaging system supporting SIP/SIMPLE.

What is claimed is:

1. A Session Initiation Protocol for Instant Messaging and Presence Leveraging Extensions (SIP/SIMPLE) instant messaging system comprising:
   a sender mobile communication terminal for generating an instant message delivery report request in the delivery of an instant message; and
   an SIP/SIMPLE server for:
      determining if the instant message can currently be transmitted to a recipient mobile communication terminal,
      if it is determined that the instant message cannot currently be transmitted to the recipient mobile communication terminal, sending a delay message to the sender mobile communication terminal, wherein the delay message comprises an indication that a delivery of the instant message to be transmitted to the recipient mobile communication terminal is being awaited, and waiting without sending an instant message delivery report until the instant message is transmitted to the recipient mobile communication terminal,
      if it is determined that the instant message can currently be transmitted to the recipient mobile communication terminal, transmitting the instant message to the recipient mobile communication terminal without sending the delay message to the sender mobile communication terminal, and
      when a response from the recipient mobile communication terminal is received after the instant message is transmitted, generating the instant message delivery report including information on whether or not the instant message is received by the recipient mobile communication terminal and sending the instant message delivery report to the sender mobile communication terminal; wherein the delay message comprises a 202 Accepted response code generated with respect to the instant message.

2. The SIP/SIMPLE instant messaging system of claim 1, wherein the instant message delivery report further includes information about a reason for a failure in the receipt of the instant message.

3. The SIP/SIMPLE instant messaging system of claim 2, wherein the instant message delivery report request and the instant message delivery report are sent through a "Message" primitive.

4. An instant messaging system in which instant messaging systems of different types interwork, the instant messaging system comprising:
   a sender mobile communication terminal connected to one of the instant messaging systems for generating an instant message delivery report request to a recipient mobile communication terminal connected to the other instant messaging system; and
   an interworking server for:
      converting a delivery format of an instant message into another suitable for the other instant messaging system,
      delivering the instant message to the recipient mobile communication terminal,
      if it is determined that the instant message cannot currently be delivered to the recipient mobile communication terminal, receiving a delay message comprising an indication that a delivery of the instant message to be transmitted to the recipient mobile communication terminal is being awaited and waiting without sending an instant message delivery report until the instant message is delivered to the recipient mobile communication terminal,
      if it is determined that the instant message can currently be delivered to the recipient mobile communication terminal, receiving a response from the recipient mobile communication terminal after the instant message is delivered, without receiving the delay message; and
      upon receiving the response from the recipient mobile communication terminal after the instant message is delivered, generating the instant message delivery report including information on whether or not the instant message is received by the recipient mobile communication terminal,
      converting a delivery format of the instant message delivery report to another suitable for the system to which the sender mobile communication terminal is connected, and
      sending the instant message delivery report to the sender mobile communication terminal; wherein the delay message comprises a 202 Accepted response code generated with respect to the instant message.

5. The instant messaging system of claim 4, wherein the instant messaging systems are an Interpersonal Messaging Service (IMPS) system and a Session Initiation Protocol for Instant Messaging and Presence Leveraging Extensions (SIP/SIMPLE) system.

6. The instant messaging system of claim 5, wherein the instant message delivery report includes any one of Successfully received, Receipt rejected, Validity expires, and Delivery failure.

7. An instant messaging system in which an Interpersonal Messaging Service (IMPS) system and a Session Initiation Protocol for Instant Messaging and Presence Leveraging Extensions (SIP/SIMPLE) system interwork, the instant messaging system comprising:
   an IMPS server for delivering an instant message according to IMPS;
   an SIP/SIMPLE server for delivering the instant message according to SIP/SIMPLE;
   a first mobile communication terminal included in a service coverage of the IMPS server;
   a second mobile communication terminal included in a service coverage of the SIP/SIMPLE server; and
   an interworking server for, if one of the mobile communication terminals generates an instant message delivery report request to the other mobile communication terminal in the delivery of the instant message,
      converting a delivery format of the instant message received from a server of a sender mobile communication terminal into another suitable for a system including a recipient mobile communication terminal,
      delivering the instant message to a server of the recipient mobile communication terminal, if it is determined that the instant message cannot currently be transmitted to the recipient mobile communication terminal, sending a delay message to the server of the sender mobile communication terminal indicating that a delivery of the instant message to be transmitted to the recipient mobile communication terminal is being awaited, and waiting without sending an instant message delivery report until the instant message is delivered to the recipient mobile communication terminal, collecting an instant message delivery report including information on whether or not the instant message is received by the recipient mobile communication terminal upon receiving a response from the recipient mobile communication terminal after the instant message is delivered, converting a delivery format of the instant message delivery report to another suitable for a system including the sender mobile communication terminal, and sending the instant message delivery report to the server of the sender mobile communication terminal.

8. The instant messaging system of claim 7, wherein the interworking server previously stores the instant message delivery report recognized by the SIP/SIMPLE server corresponding to the instant message delivery report collected by the IMPS server.

9. The instant messaging system of claim 8, wherein the instant message delivery report collected by the IMPS server is sent to the interworking server through a "Delivery Report Request" primitive and the instant message delivery report recognized by the SIP/SIMPLE server corresponds to a response code included in a "Response Code" primitive.

10. The instant messaging system of claim 9, wherein the delay message comprises a 202 Accepted response code.

* * * * *